US012631200B2

(12) United States Patent
Moradi et al.

(10) Patent No.: US 12,631,200 B2
(45) Date of Patent: May 19, 2026

(54) HYDRAULIC DRIVE SYSTEM HAVING A 2×2Q PUMP UNIT

(71) Applicant: HMS—Hybrid Motion Solutions GmbH, Rutesheim (DE)

(72) Inventors: Mehran Moradi, Boeblingen (DE); Achim Helbig, Stuttgart (DE); Matthias Roegner, Erlingheim (DE); Magnus Junginger, Koenigsbronn (DE)

(73) Assignee: HMS-HYBRID MOTION SOLUTIONS, GmbH, Rutesheim (DE)

( * ) Notice: Subject to any disclaimer, the term of this patent is extended or adjusted under 35 U.S.C. 154(b) by 62 days.

(21) Appl. No.: 18/691,465

(22) PCT Filed: Sep. 12, 2022

(86) PCT No.: PCT/EP2022/075244

§ 371 (c)(1),
(2) Date: Mar. 13, 2024

(87) PCT Pub. No.: WO2023/041473

PCT Pub. Date: Mar. 23, 2023

(65) Prior Publication Data

US 2024/0401614 A1 Dec. 5, 2024

(30) Foreign Application Priority Data

Sep. 15, 2021 (DE) ......................... 102021123914.1

(51) Int. Cl.
*F15B 21/14* (2006.01)
*B30B 15/16* (2006.01)
(Continued)

(52) U.S. Cl.
CPC ............ *F15B 1/033* (2013.01); *B30B 15/163* (2013.01); *F15B 7/006* (2013.01); *F15B 11/024* (2013.01);
(Continued)

(58) Field of Classification Search
None
See application file for complete search history.

(56) References Cited

U.S. PATENT DOCUMENTS 5,042,336 A * 8/1991 Capps ..................... B30B 15/26 83/13
6,240,758 B1 * 6/2001 Nagakura ............... B30B 1/323 72/21.4
(Continued)

FOREIGN PATENT DOCUMENTS

DE 102011-078241 B3 9/2012
WO WO-2018-028944 A1 2/2018

*Primary Examiner* — Michael Quandt
(74) *Attorney, Agent, or Firm* — Douglas Denninger

(57) ABSTRACT

A hydraulic drive system for operating a hydraulic cylinder in first and second movement profiles. A hydraulic drive unit includes first and second hydraulic machines, each with first and second connections. In the first movement profile, a first cylinder chamber of the hydraulic cylinder is fluidly connected to a first fluid reservoir and a second cylinder chamber is fluidly connected to the second connection of the second hydraulic machine. In the second movement profile, the first connection of the first hydraulic machine is connected to the second connection of the second hydraulic machine.

15 Claims, 4 Drawing Sheets

(51) Int. Cl.
*F15B 1/033* (2006.01)
*F15B 7/00* (2006.01)
*F15B 11/024* (2006.01)

(52) U.S. Cl.
CPC .............. *F15B 21/14* (2013.01); *F15B 7/001* (2013.01); *F15B 2211/20515* (2013.01); *F15B 2211/20538* (2013.01); *F15B 2211/20561* (2013.01); *F15B 2211/20569* (2013.01); *F15B 2211/20584* (2013.01); *F15B 2211/27* (2013.01); *F15B 2211/3058* (2013.01); *F15B 2211/329* (2013.01); *F15B 2211/41572* (2013.01); *F15B 2211/6651* (2013.01); *F15B 2211/6658* (2013.01); *F15B 2211/7053* (2013.01); *F15B 2211/775* (2013.01); *F15B 2211/785* (2013.01); *F15B 2211/88* (2013.01)

(56) References Cited

U.S. PATENT DOCUMENTS

| | | | | |
|---|---|---|---|---|
| 9,903,394 | B2 * | 2/2018 | Brahmer | F15B 11/022 |
| 2012/0031087 | A1 | 2/2012 | Reynolds et al. | |
| 2020/0018329 | A1 | 1/2020 | Zeller et al. | |
| 2021/0317848 | A1 | 10/2021 | Consonni et al. | |

* cited by examiner

HYDRAULIC DRIVE SYSTEM HAVING A 2×2Q PUMP UNIT

The invention relates to a hydraulic drive system, in particular a hydraulic drive system for operating a hydraulic cylinder in a first movement profile and in a second movement profile. Furthermore, the invention relates to the use of the hydraulic drive system for controlling a hydraulic drive cylinder in a press system.

Hydraulic drive systems are used in many types of industrial application. In this regard, generic hydraulic drive systems are found in forming systems, including presses, for example deep drawing presses, folding presses, forging presses, bending machines, stamping presses, milling systems and in mechanical engineering in general.

Published document DE 10 2012 013 098 B4 proposes an electrohydrostatic drive system for use in a folding press. The drive system proposed in the said published document has a specifically designed 3-surface cylinder-piston unit, which may be started up by a 2-quadrant hydraulic machine in conjunction with a pressurized accumulator unit, which hydraulic machine is driven at variable speed via an electric motor. The proposed electrohydrostatic drive system is disadvantageous in that the specific, complex and non-variable size of the cylinder-piston unit does not allow the necessary flexibility for the manufacturer of the folding press and, moreover, the maintenance of the electrohydrostatic drive system is hindered significantly through the use of a pressurized system.

The said problems have been recognized and addressed by published document DE 10 2016 118 853 B3. In published document, DE 10 2016 118 853 B3, a solution is proposed which includes a 2-quadrant hydraulic machine in conjunction with an unpressurized accumulator device, which hydraulic machine is driven at variable speed by an electric motor. The above-mentioned problems are solved by this solution.

However, further problems, which are addressed by the present invention, are still evident for certain applications. In particular, this solution requires extensive use of hydraulic switching valves, which has a negative effect on the efficiency and productivity of the drive system.

Moreover, the increased number of switching valves makes the design and the control logic correspondingly more complex. Furthermore, the efficiency is impaired significantly due to the necessary throttling of the throughflow on the rod side during the load stroke.

A technical object forming the basis of the invention may therefore consist in at least partially rectifying the disadvantages recognized in the prior art and providing a hydraulic drive system in which a hydraulic cylinder with different surfaces may be operated efficiently from a non-pressurized fluid-hydraulic reservoir.

According to the invention, this object is achieved according to a first aspect by a hydraulic drive system having the features of the independent claim 1. Advantageous developments of the hydraulic drive system are found in the dependent claims relating to the hydraulic drive system.

According to the invention, the hydraulic drive system for operating a hydraulic cylinder in a first movement profile and in a second movement profile has a hydraulic cylinder comprising a first cylinder chamber and a second cylinder chamber.

The hydraulic cylinder is preferably designed as at least a differential cylinder. Alternatively, the hydraulic cylinder may be designed as at least a differential cylinder having two piston rods, which have a different diameter. The first cylinder chamber and the second cylinder chamber of the hydraulic cylinder may each be designed both as the ring side and as the piston side of the hydraulic cylinder.

Furthermore, the hydraulic drive system has a first fluid-hydraulic reservoir. Moreover, the fluid-hydraulic drive system has a hydraulic drive unit having a first hydraulic machine. The first hydraulic machine has a first connection and a second connection. Furthermore, the hydraulic drive unit has a second hydraulic machine having a first connection and a second connection.

Furthermore, the hydraulic drive system has at least a first controllable valve and a second controllable valve. The first controllable valve creates a fluid-hydraulic connection between the first cylinder chamber of the hydraulic cylinder and the first fluid-hydraulic reservoir in accordance with a movement profile. The second controllable valve creates a fluid-hydraulic connection between the second connection of the second hydraulic machine and the second cylinder chamber of the hydraulic cylinder, or alternatively with the first connection of the first hydraulic machine, in accordance with the movement profile.

Furthermore, the first hydraulic machine and the second hydraulic machine are mechanically interconnected and are operated jointly by a variable-speed drive. The variable-speed drive may be designed as a variable-speed electric motor and/or an electric motor with a variable direction of rotation. Variable-speed drives substantially comprise an electric motor, at least one hydraulic pump, for example at least one 2×2 Q pump unit, and a frequency converter, which includes motor speed or motor torque regulation. For example, an electrically driven constant pump delivers a demand-based volume flow in order to regulate pressure, power, speed, position or output at a cylinder, depending on the task.

Moreover, the second connection of the first hydraulic machine and the first connection of the second hydraulic machine are fluid-hydraulically connected to the first fluid-hydraulic reservoir.

According to the invention, in the first movement profile, the cylinder chamber is fluid-hydraulically connected to the first fluid-hydraulic reservoir and the second cylinder chamber is fluid-hydraulically connected to the second connection of the second hydraulic machine.

According to the invention, in the second movement profile, the first connection of the first hydraulic machine is connected to the second connection of the second hydraulic machine.

Within the context of the present invention, a first movement profile and a second movement profile are understood to be a rapid traverse and a power stroke. In particular, the hydraulic cylinder may be displaced in rapid traverse mode and in power stroke mode. A rapid traverse is understood to refer to the quick positioning movement of the hydraulic cylinder when it is displaced in the direction of the workpiece and in the opposite direction away from the workpiece. A power stroke is understood to refer to a powerful positioning movement of the hydraulic cylinder when it is displaced in the direction of the workpiece or the direction involves the extending direction of the hydraulic cylinder. In power stroke mode, more power is available under a certain fluid pressure, but it involves a lower displacement speed of the hydraulic cylinder. In rapid traverse mode, less power is available under the same specified fluid pressure, but the hydraulic cylinder executes a position change at higher speed. This is realized by a change in the effective or active surfaces of the hydraulic cylinder.

The hydraulic drive system according to the invention may be advantageously used for forming machines, such as folding presses. All process phases required for use in folding presses may be implemented, including upward/downward rapid traverse and upward/downward power stroke. The hydraulic drive system enables the use of differential cylinders with any surface ratios. The technical design and the activation of the hydraulic drive system are configured to be more efficient, simpler and therefore more economical due to the use of only one required switching valve. Necessary maintenance and repair work on the hydraulic drive system can be carried out more easily and quickly owing to the use of a non-pressurized fluid-hydraulic reservoir (tank).

In a first embodiment, the hydraulic drive system furthermore comprises a pressure relief valve. The pressure relief valve is fluid-hydraulically connected between the second cylinder chamber and the fluid-hydraulic reservoir. The fluid may therefore be returned to the fluid-hydraulic reservoir. The pressure relief valve (PRV) serves to control the chamber pressure of the second cylinder chamber of the hydraulic cylinder so that it does not exceed a certain pressure. With too high a pressure, the fluid is returned to the fluid-hydraulic reservoir. In particular, the pressure relief valve serves for controlling the pressure on the ring side during the power stroke.

In a further embodiment, the hydraulic machines are selected from a group of pumps which comprises at least one displacement pump. The hydraulic machine here may be designed, for example, as an axial piston pump, radial piston pump or vane pump, gear pump, helicoidal gear pump and the like.

In a further embodiment, the first fluid-hydraulic reservoir is designed as a non-pressurized fluid-hydraulic reservoir. The reservoir is designed to supply additional hydraulic fluid for the hydraulic drive system according to demand. The oscillating volume of the hydraulic cylinder, in particular the at least one differential cylinder, may be stored or provided via the fluid-hydraulic reservoir. Moreover, the amount of compression is provided via the fluid-hydraulic reservoir. It is furthermore advantageous that the overall size may be reduced in relation to a pressurized fluid-hydraulic reservoir. This is reflected in simple and more cost-effective maintenance units. Maintenance of the drive system may take place without the need for special tools. Moreover, the non-pressurized fluid-hydraulic reservoir is safer since, unlike in the case of a pressurized fluid-hydraulic reservoir, energy is no longer stored when the drive system is in the off state.

In a further embodiment, to switch the switching position, the second controllable valve is in fluid-hydraulic communication with the first cylinder chamber of the hydraulic cylinder via a pilot line. The pilot lines in this embodiment represent hydraulic lines which are designed with a smaller cross section than the further hydraulic lines of the hydraulic drive system according to the invention. The pressure is tapped from the first cylinder chamber via the pilot lines. As soon as pressure is applied to the first cylinder chamber, the second controllable valve is activated and switches accordingly. The switching position of the second controllable valve is changed.

In a further embodiment, to switch the switching position, the first controllable valve is in fluid-hydraulic communication with the second cylinder chamber of the hydraulic cylinder via a pilot line. The pilot lines in this embodiment represent hydraulic lines which are designed with a smaller cross section than the further hydraulic lines of the hydraulic drive system according to the invention. The pressure is tapped from the second cylinder chamber via the pilot lines. As soon as the pressure is applied to the second cylinder chamber, the first controllable valve is activated and switches accordingly. The switching position of the first controllable valve is changed.

In a further embodiment, the first controllable valve switches the switching position as a result of a received control signal. In a further embodiment, the second controllable valve switches the switching position as a result of a received control signal. It is also advantageously possible to use controllable valves which are activated via an electrical signal. In particular, the first controllable valve and the second controllable valve change their switching position when an electrical signal is applied. The electrical signal may be provided by a computer unit, a programmable logic control and/or a microcontroller. The electrical signal (control signal) may bring about a change in the switching position when the signal is applied. Alternatively, the switching off, and therefore lack, of the electrical signal may bring about a change in the switching position. In this case, the resetting of the valve is realized via a resetting spring. Furthermore, a valve which is switched back using compressed air may be provided.

In a further embodiment, the hydraulic cylinder comprises a first hydraulic cylinder surface and a second hydraulic cylinder surface. The hydraulic cylinder is preferably designed as at least a differential cylinder. The first hydraulic cylinder surface and the second hydraulic cylinder surface are different. The differential cylinders used are generally designed with only one piston rod. This may result in a shorter overall length, a greater achievable force on the piston side and a simplified design of the seal on the hydraulic cylinder, for example. It is known that ca. 80% of the hydraulic cylinders used in practice are designed as differential cylinders.

In a further embodiment, the hydraulic drive system comprises a third valve. The third valve is connected between the second cylinder chamber of the hydraulic cylinder and the second controllable valve. In a further embodiment, the hydraulic drive system comprises a fourth valve. The fourth valve is connected between the second cylinder chamber of the hydraulic cylinder and a second hydraulic fluid reservoir. Via the third valve and the fourth valve, fluid from the second cylinder chamber may be supplied to, and stored in, the fluid-hydraulic reservoir during the extension of the hydraulic cylinder. The stored fluid may be used for recuperation. The stored energy may be used during the upward movement of the hydraulic cylinder. Furthermore, the energy stored in the fluid-hydraulic reservoir may be converted into electric energy via the hydraulic machine with the connected electric drive.

In a further embodiment, the second fluid-hydraulic reservoir is designed as a pressurized fluid-hydraulic reservoir. In particular, a pressurized fluid-hydraulic reservoir is understood to refer to a closed reservoir in which the pressure within the reservoir is different to the external pressure. The pressure in the pressurized fluid-hydraulic reservoir may be recuperated. Energy may therefore be recovered or the energy consumption reduced. The inventors here have ascertained a reduction in the energy consumption of up to 20% depending on the operating cycle and when compared to systems without the design according to the invention.

In a further embodiment, the pressurized fluid-hydraulic reservoir has a pressure which is greater than the pressure resulting from the mass and from the moving mass actively acting on the hydraulic cylinder and from the cylinder surface, in particular from the ring side of the hydraulic cylinder. The pressure level should therefore be as low as possible, but provide at least such a pressure that the effective mass of the hydraulic cylinder may be compensated.

In a further embodiment, the third valve and the fourth valve are designed as 2/2-way valves. The storage of the fluid in the second fluid-hydraulic reservoir and the recuperation may be controlled via the third valve and the fourth valve. In a fourth embodiment, the first hydraulic machine and the second hydraulic machine have a high pressure connection and a low pressure connection. In a further embodiment, the first hydraulic machine has a greater delivery volume than the second hydraulic machine. In a further embodiment, both the first hydraulic machine and the second hydraulic machine have a pressure connection and a suction connection. The first hydraulic machine and the second hydraulic machine may take in hydraulic fluid from the fluid-hydraulic reservoir, in particular from a non-pressurized fluid-hydraulic reservoir. In relation to the second hydraulic machine, the first hydraulic machine is advantageously designed as the hydraulic machine with the greater delivery volume. As a result of the greater delivery volume and the connection to the first cylinder chamber (piston side) with the greatest surface, some of the volume flow may be tapped and provided to the second hydraulic machine via the second controllable valve so that this second hydraulic machine does not have to take fluid from the fluid-hydraulic reservoir. In particular, a cavitation of the second hydraulic machine is prevented here.

According to a further aspect, the present invention relates to a hydraulic drive system for controlling a hydraulic cylinder in a press system.

The above configurations and developments can be combined in any manner, to the extent that this is reasonable. Further possible configurations, developments and implementations of the invention also comprise combinations—not explicitly mentioned—of features of the invention which are described above or below with respect to the exemplary embodiments. In particular, a person skilled in the art will also add individual aspects as improvements or additions to the respective basic form of the present invention.

The invention is explained below with reference to various embodiments, wherein it is pointed out that modifications or additions which are directly apparent to a person skilled in the art are also included in these examples. Moreover, these preferred exemplary embodiments do not represent a restriction of the invention, in the sense that modifications and additions fall within the scope of the present invention.

In the figures of the drawing, similar, functionally similar and similarly acting elements, features and components are each denoted by the same reference signs-unless stated otherwise. In the drawing.

Figure 1:
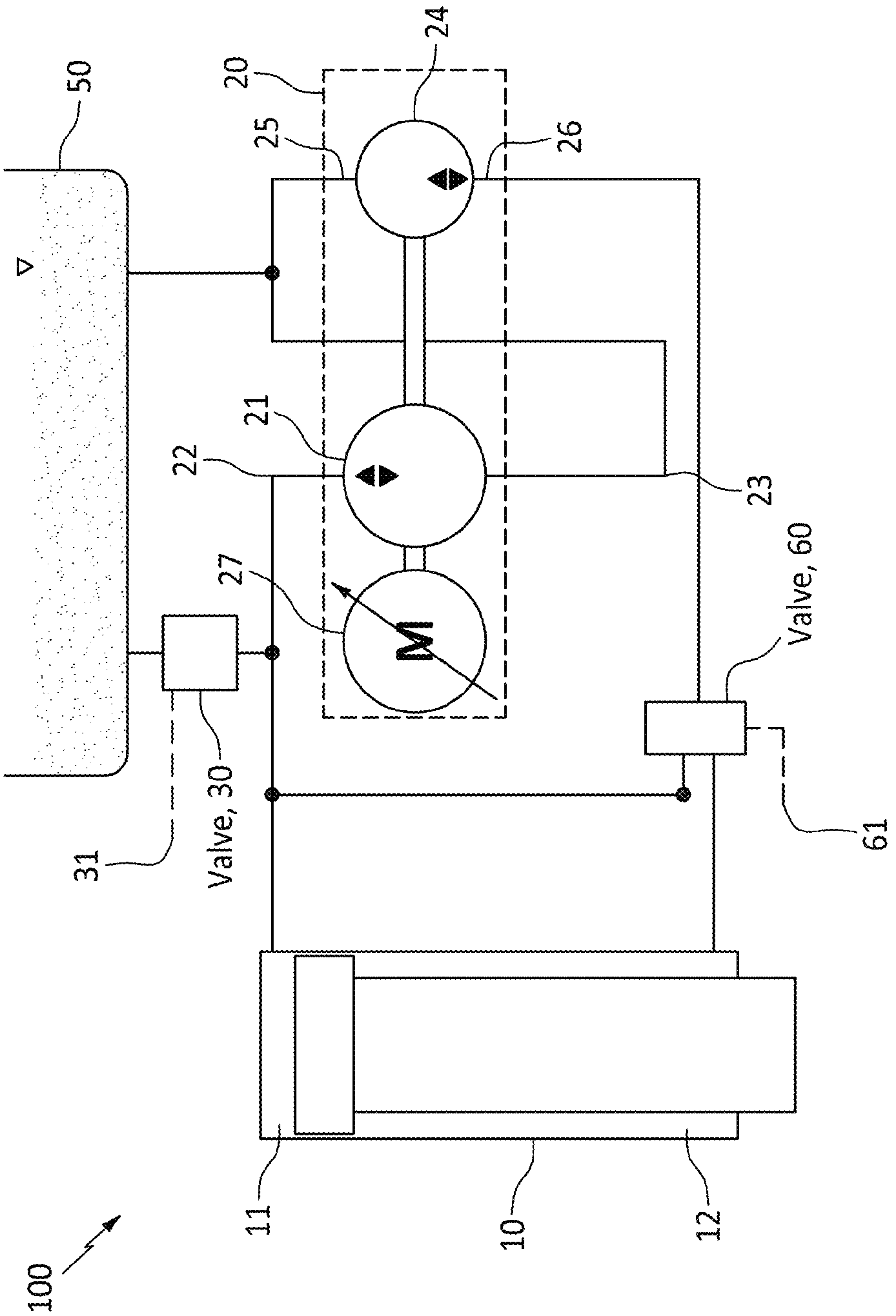
FIG. 1 shows a first embodiment of the hydraulic drive system according to the present invention.

FIG. 1 shows an embodiment of the hydraulic drive system 100 according to the present invention. The hydraulic drive system 100 is designed to be operated in a first movement profile and in a second movement profile. In the first movement profile, the movement speed during the extension and retraction of the hydraulic cylinder 10 is greater than in the second movement profile.

The hydraulic drive system 100 comprises a hydraulic cylinder 10. The hydraulic cylinder 10 has a first cylinder chamber 11 (piston side) and a second cylinder chamber 12 (ring side). The hydraulic cylinder 10 has a first hydraulic cylinder surface and a second hydraulic cylinder surface. The first hydraulic cylinder surface and the second hydraulic cylinder surface are designed to be different. The hydraulic cylinder 10 is preferably designed as at least a differential cylinder.

Furthermore, a fluid-hydraulic reservoir 50 is provided. The fluid-hydraulic reservoir 50 has fluid-hydraulic connections to a first hydraulic machine 21 and to a second hydraulic machine 24.

Furthermore, the hydraulic drive system 100 has a hydraulic drive unit 20. The hydraulic drive unit 20 comprises the first hydraulic machine 21 and the second hydraulic machine 24. The first hydraulic machine 21 has a first connection 22 and a second connection 23. The second hydraulic machine 24 has a first connection 25 and a second connection 26. The connections of the first hydraulic machine 21 and the second hydraulic machine 24 may be designed as a high pressure connection and a low pressure connection. In particular, the first connection 22 of the first hydraulic machine 21 and the second connection 26 of the second hydraulic machine 24 are designed as a high pressure connection. The second connection 23 of the first hydraulic machine 21 and the first connection 25 of the second hydraulic machine 24 are designed as a low pressure connection. In one embodiment, the first hydraulic machine 21 and the second hydraulic machine 24 have different delivery volumes. The first hydraulic machine 21 preferably has a higher delivery volume than the second hydraulic machine 24. The first hydraulic machine 21 and the second hydraulic machine 24 are mechanically interconnected. In particular, the first hydraulic machine 21 and the second hydraulic machine 24 may be mechanically interconnected (coupled) via a shaft. The first hydraulic machine 21 and the second hydraulic machine 24 are operated jointly by a variable-speed drive 27 of the hydraulic drive unit 20. The variable-speed drive 27 may be designed as a variable-speed electric motor or an electric motor with a variable direction of rotation. Variable-speed drives 27 substantially comprise an electric motor, a hydraulic pump and a frequency converter, for which the software sets the motor speed. Furthermore, the direction of rotation of the drive 27 may be specified via the frequency converter. A retraction and extension of the hydraulic cylinder 10 may thus be provided.

The hydraulic drive system 100 furthermore comprises a first controllable valve 30. The first controllable valve 30 may create a fluid-hydraulic connection between the first cylinder chamber 11 of the hydraulic cylinder 10 and the first fluid-hydraulic reservoir 50 in accordance with a movement profile. The first controllable valve 30 has a pilot line 31. The pilot line 31 may be designed as a hydraulic pilot line or as an electric pilot line. A change in the switching state of the first controllable valve 30 may take place as a result of connecting the pilot line 31.

The hydraulic drive system 100 furthermore comprises a second controllable valve 60. The second controllable valve 60 may create a fluid-hydraulic connection between the second connection 26 of the second hydraulic machine 24 and the second cylinder chamber 12 of the hydraulic cylinder 10 in accordance with the movement profile. Alternatively, the second controllable valve 60 may create a fluid-hydraulic connection between the second connection 26 of the second hydraulic machine 24 and the first connection 22 of the hydraulic machine 21. Furthermore, the movement profile may be selected via the second controllable valve 60. It is provided that the drive system according to the invention is operated in bump bending mode. This mode enables a smooth, wide radius to be produced in thick, high-strength plate, for example. This places high technical demands on the hydraulic drive system 100 since bump bending involves dozens of bends bent by the brake punch a few degrees at a time. The dozens of bends are realized by small upward and downward movements of the hydraulic cylinder 10.

To this end, during the downward movement of the hydraulic cylinder 10, a fluid-hydraulic connection is created between the second cylinder chamber 12 of the hydraulic cylinder 10 and the pressurized fluid-hydraulic reservoir 90. Furthermore, the second connection 26 of the second hydraulic machine 24 is fluid-hydraulically connected to the first connection 22 of the hydraulic machine 21. The hydraulic cylinder 10, in particular the piston rod of the hydraulic cylinder 10, moves with a uniform upward and downward movement (bump bending).

The second controllable valve 60 has a pilot line 61. The pilot line 61 may be designed as a hydraulic pilot line or as an electric pilot line. A change in the switching state of the second controllable valve 60 may take place as a result of connecting the pilot line 61.

It is provided that the second connection 23 of the first hydraulic machine 21 and the first connection 25 of the second hydraulic machine are fluid-hydraulically connected to the first fluid-hydraulic reservoir 50. In one embodiment, it is provided that the fluid-hydraulic reservoir 50 is designed as a non-pressurized hydraulic reservoir.

Furthermore, it is provided that, in a first movement profile, the first cylinder chamber 11 is fluid-hydraulically connected to the first fluid-hydraulic reservoir 50. In particular, the first cylinder chamber 11 of the hydraulic cylinder 10 is fluid-hydraulically connected to the first fluid-hydraulic reservoir 50 via the first controllable valve 30. Moreover, the second cylinder chamber 12 is fluid-hydraulically connected to the second connection 26 of the hydraulic machine 24. In particular, the second cylinder chamber 12 of the hydraulic cylinder 10 is fluid-hydraulically connected to the second connection 26 of the second hydraulic machine 24 via the second controllable valve 60.

It is furthermore provided that, in a second movement profile, the first connection 22 of the first hydraulic machine 21 is connected, in particular fluid-hydraulically connected, to the second connection 26 of the second hydraulic machine 24. Furthermore, in the second movement profile, the first controllable valve 30 is switched so that there is no fluid-hydraulic connection to the first fluid-hydraulic reservoir 50.

Figure 2:
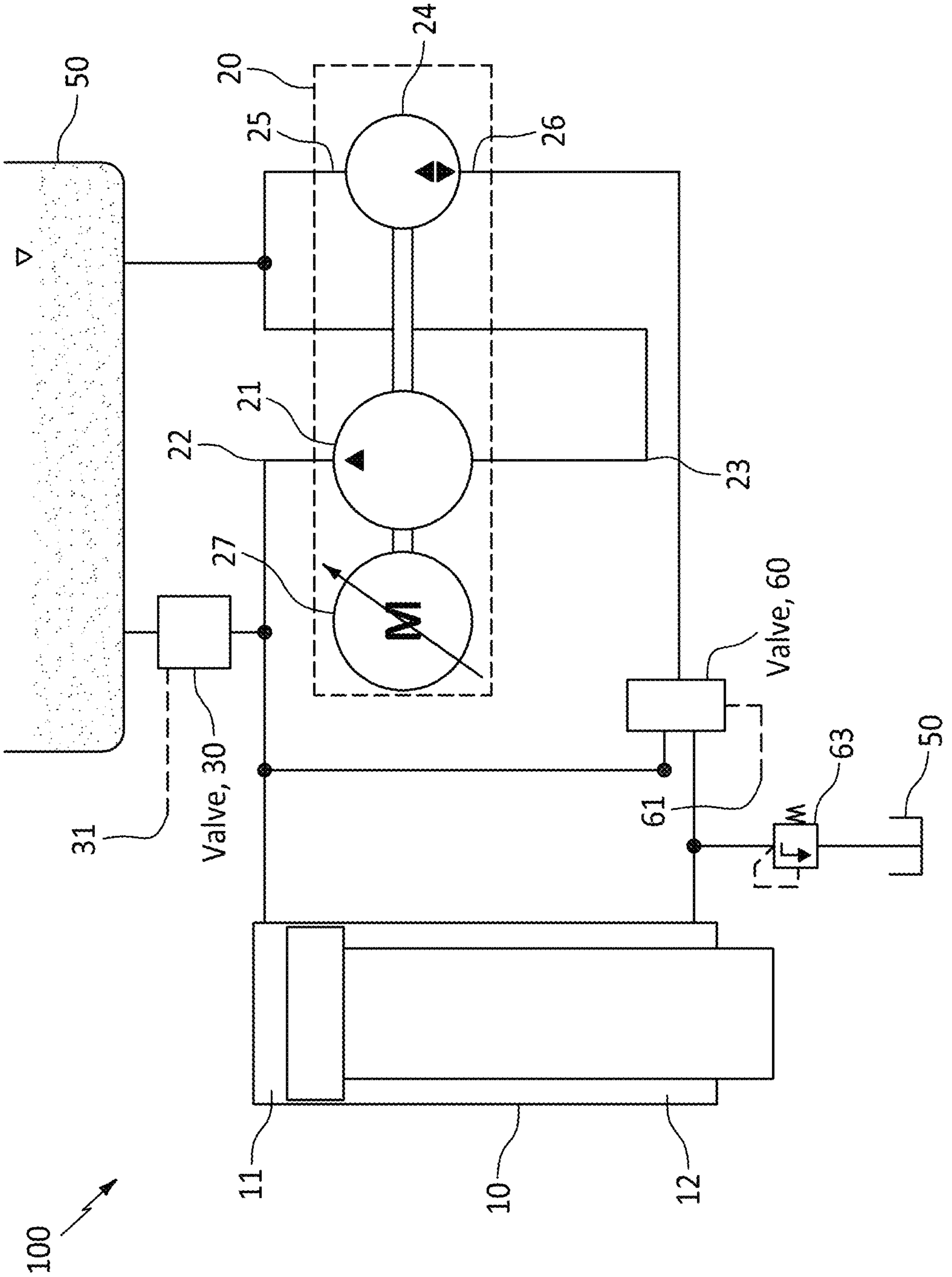
FIG. 2 shows a further embodiment of the hydraulic drive system according to the present invention.

FIG. 2 shows a further embodiment of a hydraulic drive system 100 according to the present invention. The hydraulic drive system 100 has the same components as the embodiment illustrated in FIG. 1. Furthermore, the hydraulic drive system 100 according to FIG. 2 has a pressure relief valve (PRV) 63. The pressure relief valve 63 has a fluid-hydraulic connection to the fluid-hydraulic reservoir 50. Fluid may be transferred into the fluid-hydraulic reservoir 50 via the fluid-hydraulic connection to the fluid-hydraulic reservoir 50. The pressure relief valve 63 in the embodiment represents an advantageous configuration in the hydraulic drive system 100. By means of the pressure relief valve 63, the maximum permissible fluid pressure is limited in order to protect the hydraulic drive system 100 and, in particular, the hydraulic cylinder 10 against too high a pressure (overpressure protection) and to avoid damage. Via a spring in the PRV, for example, the PRV enables the fluid to flow from the fluid connection into the fluid-hydraulic reservoir 50 if the pressure in the hydraulic drive system 100 exceeds a desired (set) value. It is generally possible to protect against exceeding the maximum permissible pump or system pressure by means of such a PRV.

Figure 3:
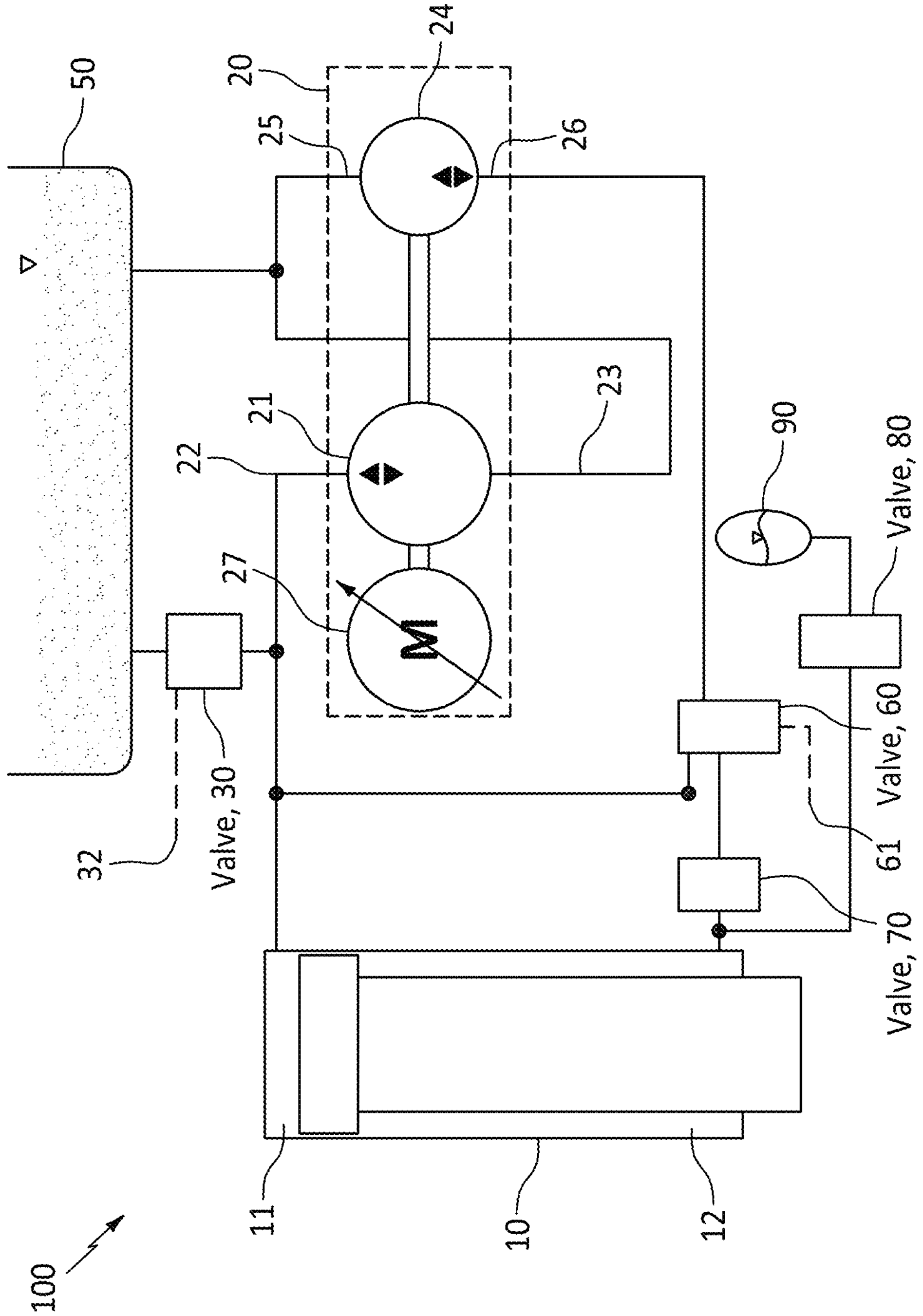
FIG. 3 shows a further embodiment of the hydraulic drive system according to the present invention.

FIG. 3 shows a further embodiment of a hydraulic drive system 100 according to the present invention. The hydraulic drive system 100 has the same components as the embodiment illustrated in FIG. 1. Furthermore, the hydraulic drive system 100 according to FIG. 3 has a third valve 70. The third valve 70 is connected between the second cylinder chamber 12 of the hydraulic cylinder 10 and the second controllable valve 60. Moreover, the embodiment of the hydraulic drive system 100 illustrated in FIG. 3 has a fourth valve 80. The fourth valve 80 is connected between the second cylinder chamber 12 of the hydraulic cylinder 10 and a second fluid-hydraulic reservoir 90. The second fluid-hydraulic reservoir 90 may be designed as a pressurized fluid-hydraulic reservoir 90. In particular, the fluid released by the cylinder chamber 12 of the hydraulic cylinder 10 may be discharged into the pressurized fluid-hydraulic reservoir 90 in a corresponding switching position of the third valve 70 and the fourth valve 80. Process energy, in particular energy present in the ring side, may thus be advantageously discharged into the pressurized fluid-hydraulic reservoir 90 during the downward movement of the hydraulic cylinder 10 and may be recuperated as needed. The energy stored in the form of pressurized fluid may be used for the downward movement of the hydraulic cylinder 10. The energy consumption of the hydraulic system 100 may thus be reduced.

Figure 4:
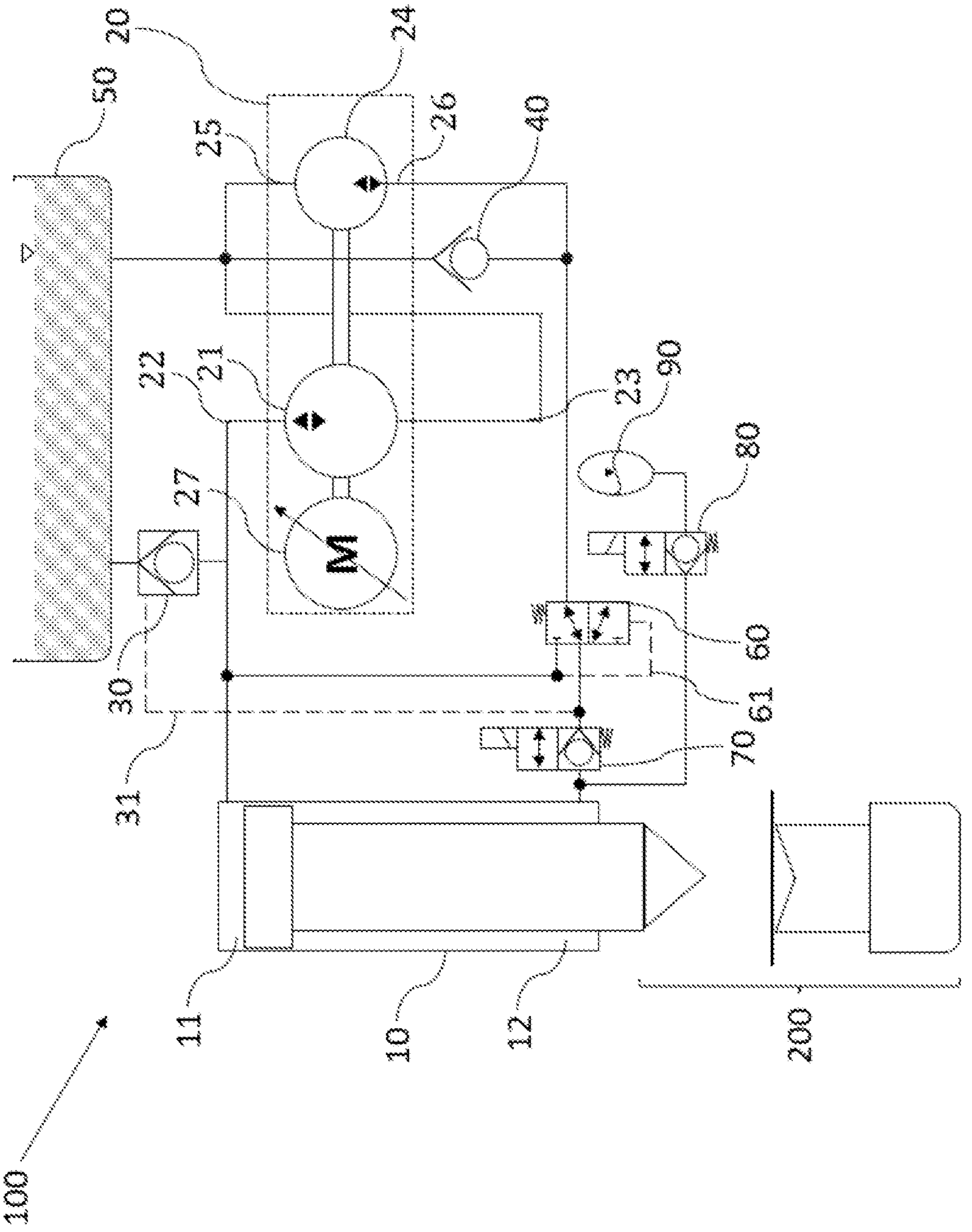
FIG. 4 shows a further embodiment of a hydraulic drive system according to the present invention, for use in controlling a hydraulic cylinder in a folding press system.

FIG. 4 shows a further embodiment of a hydraulic drive system 100 according to the present invention for use in controlling a hydraulic cylinder 10 in a press system, for example in a folding press system. Reference sign 200 denotes the press system. When using folding press systems, plate to be treated is placed between a die with a V-shaped opening and a hydraulic cylinder 10 with a conical workpiece. If the hydraulic cylinder 10 is lowered with a certain force, the workpiece is pressed into the opening and bent to the required angle.

Furthermore, the first controllable valve 30 illustrated in the embodiment of FIG. 4 is depicted as a controllable non-return valve 30. The controllable non-return valve 30 has a first switching position "blocked" and a second switching position "open". In the second switching position, fluid may escape from the non-pressurized fluid-hydraulic reservoir 50. In the embodiment illustrated in FIG. 4, to switch the switching position, the controllable non-return valve 30 is in fluid-hydraulic communication with the second cylinder chamber 12 of the hydraulic cylinder 10 via a pilot line 31. In an embodiment which is not shown, the switching position may be switched via a received control signal 31, in particular an electrical control signal 31.

Furthermore, the second controllable valve 60 is designed as a 3/2-way valve. The 3/2-way valve has a first and a second switching position. A first switching position provides a fluid-hydraulic connection between the second cylinder chamber 12 of the hydraulic cylinder 10 and the second connection 26 of the second hydraulic machine 24 (c.f. FIG. 4). A second switching position creates a fluid-hydraulic connection between a first cylinder chamber 11 of the hydraulic cylinder 10 and the second connection 26 of the second hydraulic machine 24. In FIG. 4, to switch the switching position, the second controllable valve 60 is in fluid-hydraulic communication with the first cylinder chamber 11 of the hydraulic cylinder 10 via a pilot line 61. In an alternative configuration, the second controllable valve 60 may also be switched via an electrical signal. Furthermore, the controllable valve 60 in the illustrated embodiment has a spring reset function. Alternatively, a pulse reset function may also be provided.

Furthermore, the third valve 70 and the fourth valve 80 are designed as 2/2-way valves. The third valve 70 and the fourth valve 80 have two switching positions, in which the valve is blocked and opened respectively in one direction. The third valve 70 and the fourth valve 80 may be electrically and hydraulically switched and have a spring reset function in the illustrated embodiment.

In the basic position of the third valve 70 and the fourth valve 80 (c.f. FIG. 4), hydraulic fluid may be transferred into the pressurized fluid-hydraulic reservoir 90.

Furthermore, a non-return valve 40 is provided in the embodiment of FIG. 4. The non-return valve 40 has a hydraulic connection to the node between the second connection 23 of the first hydraulic machine 21 and the first connection 25 of the second hydraulic machine 24 and the second connection 26 of the second hydraulic machine 24 and to the first fluid-hydraulic reservoir 50. The non-return valve 40 is a safety valve for the second hydraulic machine 24 and prevents the cavitation of the second hydraulic machine 24. This is especially advantageous if, in an alternative embodiment, the fluid-hydraulic reservoir 50 is designed as a pressurized fluid-hydraulic reservoir 50.

The hydraulic drive system 100 is provided for operating the hydraulic cylinder 10 in a first movement profile and in a second movement profile. The movement speed of the hydraulic cylinder 10 is preferably greater in the first movement profile than during the movement using the second movement profile. The provision of a power movement is greatest when using the second movement profile.

In the first movement profile, the first cylinder chamber 11 of the hydraulic cylinder 10 is fluid-hydraulically connected to the first fluid-hydraulic reservoir 50. Furthermore, the connection 22 of the first hydraulic machine 21 is connected to the first cylinder chamber 11 of the hydraulic cylinder 10. During the first movement profile in the downward stroke of the hydraulic cylinder 10, the first hydraulic machine 21 pumps fluid into the first cylinder chamber 11. Since the volume on the piston side is greater than the volume on the ring side and therefore further fluid is required, the cylinder chamber 11 of the hydraulic cylinder 10 may take in fluid from the non-pressurized reservoir 50 via the non-return valve 30. Furthermore, the second cylinder chamber 12 of the hydraulic cylinder 10 is fluid-hydraulically connected to the second connection 26 of the second hydraulic machine 24 via the valve 60. The fluid taken from the hydraulic cylinder 10 is supplied to the cylinder chamber 11 via the first hydraulic machine 21 and to the second hydraulic machine 24.

As previously illustrated, the first movement profile in one embodiment may likewise be used for the upward stroke of the hydraulic cylinder 10. The switching position of the valves involved remains unchanged and only the direction of rotation of the drive 27 changes. To this end, the excess fluid which may not be received by the ring side (piston side has a greater surface and therefore more volume) is supplied to the non-pressurized fluid reservoir 50 via the activated non-return valve 30.

Via the second controllable valve 60, it is possible to determine the movement profile in which the hydraulic drive system 100 is operating. If the second controllable valve 60 is activated, for example, then the hydraulic drive system 100 is in the second movement profile. If the second controllable valve 60 is in the idle position, then the hydraulic drive system 100 is in the first movement profile. The second controllable valve 60 may subsequently remain in the switching position. Active switching of the movement profile takes place via the third valve 70. It is possible to actively switch between the first movement profile and the second movement profile. The second controllable valve 60 switches as a result of the active switching of valve 70. There is a positive control between the second controllable valve 60 and the third valve 70. In the second movement profile, a power-transmitting movement of the hydraulic cylinder 10 is executed with the tool inserted. To this end, the first connection 22 of the first hydraulic machine 21 is fluid-hydraulically connected to the second connection 26 of the second hydraulic machine 24 via the 3/2-way valve 60.

The effective pump volume is decreased as a result of the switching of the second controllable valve 60. During the hydraulic motor operation, the second hydraulic machine 24 discharges some of the volume flow which is provided by the first hydraulic machine 21. The resultant reactive output torque of the second hydraulic machine 24 is provided as a driving torque via the mechanical connection of the hydraulic machines. The effectively delivered volume flow in the direction of the first cylinder chamber 11 is therefore decreased. The required driving torque is therefore likewise reduced. Moreover, the first connection 22 of the first hydraulic machine 21 is hydraulically connected to the first cylinder chamber 11 of the hydraulic cylinder 10. The non-return valve 30 is closed. The first hydraulic machine 21 is connected to the non-pressurized fluid-hydraulic reservoir 50 via the second connection 23. Moreover, the first connection 25 of the second hydraulic machine 24 is connected to the non-pressurized fluid-hydraulic reservoir 50. Via these fluid-hydraulic connections, fluid is taken from the non-pressurized fluid-hydraulic reservoir 50 via the low pressure side of the hydraulic machines 21, 24. The fluid which is transported away from the second cylinder chamber 12 of the hydraulic cylinder may be transferred to, and stored in, the pressurized fluid-hydraulic reservoir 90 via the 2/2-way valves 70/80 in a corresponding switching position. By way of example, the energy stored in this way may be used for the bump bending. The stored energy may be supplied for the upward movement in the first movement profile.

LIST OF REFERENCE SIGNS

100 Hydraulic drive system
200 Folding press system
10 Hydraulic cylinder
11 First cylinder chamber
12 Second cylinder chamber
20 Hydraulic drive unit
21 First hydraulic machine
22 First connection of the first hydraulic machine
23 Second connection of the first hydraulic machine
24 Second hydraulic machine
25 First connection of the second hydraulic machine
26 Second connection of the second hydraulic machine
27 Variable-speed drive
30 First controllable valve
31 Pilot line
40 Non-return valve
50 First fluid-hydraulic reservoir
60 Second controllable valve
61 Pilot line
63 Pressure relief valve

70 Third controllable valve
80 Fourth controllable valve
90 Second fluid-hydraulic reservoir

The invention claimed is:

1. A hydraulic drive system for operating a hydraulic cylinder in a first movement configuration and in a second movement configuration, the system comprising:

a hydraulic cylinder including a first cylinder chamber and a second cylinder chamber;

a first fluid-hydraulic reservoir;

a hydraulic drive unit having a first hydraulic machine having a first fluid line and a second fluid line and a second hydraulic machine having a first fluid line and a second fluid line;

a first controllable valve having at least first and second valve positions, wherein the first controllable valve creates a fluid-hydraulic connection between the first cylinder chamber of the hydraulic cylinder and the first fluid-hydraulic reservoir in accordance with at least one of the first and second movement configurations;

a second controllable valve, wherein the second controllable valve creates a fluid-hydraulic connection between the second fluid line of the second hydraulic machine and (i) with the second cylinder chamber of the hydraulic cylinder in a first valve position in accordance with one of the first and second movement configurations and (ii) with the first fluid line of the first hydraulic machine in a second valve position in accordance with the other of the first and second movement configurations;

wherein the first hydraulic machine and the second hydraulic machine are mechanically interconnected and are operated jointly by a variable-speed drive in a same direction of rotation;

wherein the second fluid line of the first hydraulic machine and the first fluid line of the second hydraulic machine are fluid-hydraulically connected to the first fluid-hydraulic reservoir;

wherein, in the first movement configuration, the first cylinder chamber is fluid-hydraulically connected to the first fluid-hydraulic reservoir and the second cylinder chamber is fluid-hydraulically connected to the second fluid line of the second hydraulic machine;

wherein, in the second movement configuration, the first fluid line of the first hydraulic machine is connected to the second fluid line of the second hydraulic machine; and wherein, to change its valve position, the first controllable valve is in fluid-hydraulic communication with the second cylinder chamber of the hydraulic cylinder via a pilot line.

2. The hydraulic drive system according to claim 1, wherein the hydraulic drive system furthermore comprises a pressure relief valve fluid-hydraulic connected between the second cylinder chamber and the fluid-hydraulic reservoir.

3. The hydraulic drive system according to claim 1, wherein the first fluid-hydraulic reservoir is configured as a non-pressurized fluid-hydraulic reservoir.

4. The hydraulic drive system according to claim 1, wherein, to change between the first valve position and the second valve position, the second controllable valve is in fluid-hydraulic communication with the first cylinder chamber of the hydraulic cylinder via a second pilot line.

5. The hydraulic drive system according to claim 1, wherein the first controllable valve changes its valve position as a result of a received control signal.

6. The hydraulic drive system according to claim 1, wherein the second controllable valve changes between the first valve position and the second valve position as a result of a received control signal.

7. The hydraulic drive system according to claim 1, wherein the hydraulic cylinder comprises a first hydraulic cylinder surface and a second hydraulic cylinder surface and the first hydraulic cylinder surface and the second hydraulic cylinder surface are different.

8. The hydraulic drive system according to claim 1, wherein the hydraulic drive system comprises a third valve and the third valve is fluidly connected between the second cylinder chamber of the hydraulic cylinder and the second controllable valve.

9. The hydraulic drive system according to claim 8, wherein the hydraulic drive system comprises a fourth valve and the fourth valve is fluidly connected between the second cylinder chamber of the hydraulic cylinder and a second fluid-hydraulic reservoir.

10. The hydraulic drive system according to claim 9, wherein the second fluid-hydraulic reservoir is configured as a pressurized fluid-hydraulic reservoir.

11. The hydraulic drive system according to claim 10, wherein the pressurized fluid-hydraulic reservoir has a pressure which is greater than the pressure resulting from a moving mass actively acting on a cylinder surface in the second cylinder chamber of the cylinder.

12. The hydraulic drive system according to claim 9, wherein the third valve and the fourth valve are each configured as a 2/2-way valve.

13. The hydraulic drive system according to claim 1, wherein the first hydraulic machine has a greater delivery volume than the second hydraulic machine.

14. The hydraulic drive system according to claim 1 configured to control a hydraulic cylinder in a press system.

15. A hydraulic drive system for operating a hydraulic cylinder in a first movement configuration and in a second movement configuration, the system comprising:

a hydraulic cylinder including a first cylinder chamber and a second cylinder chamber;

a first fluid-hydraulic reservoir;

a hydraulic drive unit having a first hydraulic machine having a first fluid line and a second fluid line and a second hydraulic machine having a first fluid line and a second fluid line;

a first controllable valve having at least first and second valve positions, wherein the first controllable valve creates a fluid-hydraulic connection between the first cylinder chamber of the hydraulic cylinder and the first fluid-hydraulic reservoir in accordance with at least one of the first and second movement configurations;

a second controllable valve, wherein the second controllable valve creates a fluid-hydraulic connection between the second fluid line of the second hydraulic machine and (i) with the second cylinder chamber of the hydraulic cylinder in a first valve position in accordance with one of the first and second movement configurations and (ii) with the first fluid line of the first hydraulic machine in a second valve position in accordance with the other of the first and second movement configurations;

wherein the first hydraulic machine and the second hydraulic machine are mechanically interconnected and are operated jointly by a variable-speed drive in a same direction of rotation;

wherein the second fluid line of the first hydraulic machine and the first fluid line of the second hydraulic machine are fluid-hydraulically connected to the first fluid-hydraulic reservoir;

wherein, in the first movement configuration, the first cylinder chamber is fluid-hydraulically connected to the first fluid-hydraulic reservoir and the second cylinder chamber is fluid-hydraulically connected to the second fluid line of the second hydraulic machine;

wherein, in the second movement configuration, the first fluid line of the first hydraulic machine is connected to the second fluid line of the second hydraulic machine; and wherein, to change between the first valve position and the second valve position, the second controllable valve is in fluid-hydraulic communication with the first cylinder chamber of the hydraulic cylinder via a pilot line.

* * * * *